United States Patent
Trimble et al.

(10) Patent No.: US 8,998,236 B2
(45) Date of Patent: Apr. 7, 2015

(54) BICYCLE FRAME WITH ADJUSTABLE SUSPENSION COMPONENTS

(75) Inventors: James Trimble, Houston, TX (US); Michael Schwartz, Whitestone, NY (US)

(73) Assignee: Morpheus Cycles, Bronx, NY (US)

( * ) Notice: Subject to any disclaimer, the term of this patent is extended or adjusted under 35 U.S.C. 154(b) by 217 days.

(21) Appl. No.: 13/357,922

(22) Filed: Jan. 25, 2012

(65) Prior Publication Data

US 2012/0235379 A1 Sep. 20, 2012

Related U.S. Application Data

(60) Provisional application No. 61/436,126, filed on Jan. 25, 2011.

(51) Int. Cl.
*B62K 25/14* (2006.01)
*B62K 25/28* (2006.01)

(52) U.S. Cl.
CPC ..................... *B62K 25/286* (2013.01)

(58) Field of Classification Search
CPC ......... B62K 25/26; B62K 25/22; B62K 25/02
USPC ...................... 280/281.1, 284, 285
See application file for complete search history.

(56) References Cited

U.S. PATENT DOCUMENTS

| | | | |
|---|---|---|---|
| 4,111,447 A | 9/1978 | Ishida | |
| 5,240,269 A | 8/1993 | Kerr | |
| 5,259,637 A | 11/1993 | Busby | |
| 5,456,481 A * | 10/1995 | Allsop et al. | 280/281.1 |
| 7,104,562 B2 | 9/2006 | Schmider | |
| 2007/0289796 A1 | 12/2007 | Hopf | |
| 2008/0164673 A1 | 7/2008 | Lane | |
| 2009/0026728 A1 | 1/2009 | Domahidy | |
| 2009/0072511 A1 | 3/2009 | Tolhurst | |
| 2009/0236819 A1 * | 9/2009 | Scurlock | 280/281.1 |

* cited by examiner

*Primary Examiner* — Joseph Rocca
*Assistant Examiner* — Jacob Knutson
(74) *Attorney, Agent, or Firm* — Smith, Gambrell & Russell

(57) ABSTRACT

A bicycle frame with an improved suspension system. The bicycle frame includes an adjustable dropout assembly that provides adequate shock absorption without affecting or being affected by the chain length or the pedaling action of the bicycle. The bicycle frame includes a uni-axis system that increases the efficiency and performance of the bicycle while eliminating latter movement found in traditional frames. The bicycle frame includes a micro-adjustable suspension system that allows the rider to easily adjust the suspension of the frame to precise measurements quickly and without additional tools.

8 Claims, 19 Drawing Sheets

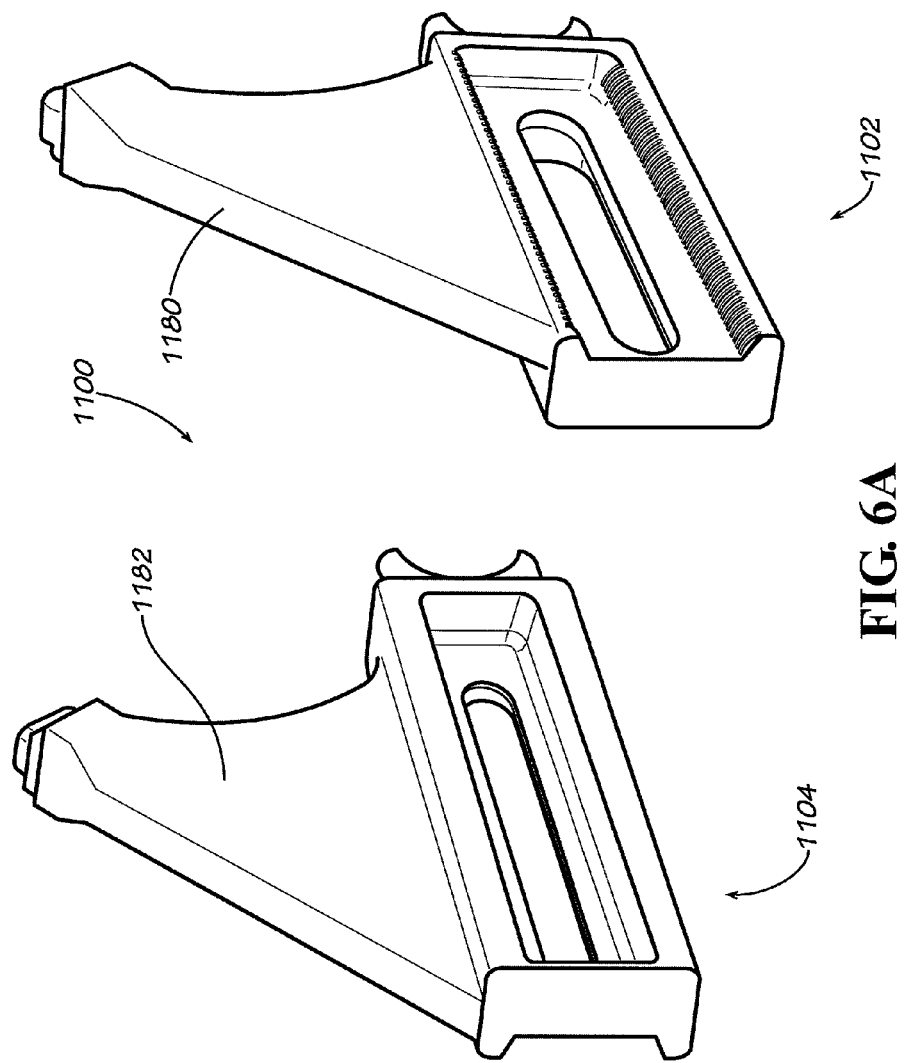

BICYCLE FRAME WITH ADJUSTABLE SUSPENSION COMPONENTS

CLAIM OF PRIORITY

This application claims priority from U.S. Provisional Patent Application No. 61/436,126 filed on Jan. 25, 2011, which is incorporated herein in its entirety.

BACKGROUND OF THE INVENTION

1. Technical Field

The present invention generally is related to the field of bicycles and bicycle frames with rear suspensions, and more particularly to downhill and dirt jump bicycles.

2. Related Art

Many conventional bicycles include front and rear suspension systems to increase the shock absorption capability of the bicycle and to increase the comfort and safety of the rider. Some of these conventional rear suspensions systems, however, are manufactured in a way that leave the frame with inadequate strength to handle the impact of downhill and dirt jumping cycling. These inadequate frames can lead to catastrophic failure of the bicycle in some instances and can cause severe injury to a rider. To combat such frame failures, many rear suspension system designs known in the art increase the strength of the frames through either using more materials in the frame, or use stronger and therefore heavier materials. Increasing the weight and mass of the frame affects the speed, handling, and aerodynamics of the bicycle. Therefore, improvements to suspension system components can increase the strength and performance of the bicycle without reducing the speed, handling, or aerodynamics of the frame.

The suspension systems typically incorporated in the rear of a bicycle, particularly in a downhill and cross-country bicycle, suffer from problems involving the bicycle chain. A bicycle's chain length, i.e., the distance between the chain ring/bottom bracket and the rear cogs/hub, can change as the bicycle's suspension system is activated. For example, a sudden increase in a chain's length can cause the chain to disengage from the chain ring or gears, causing the rider a complete loss of pedaling ability. Additionally, conventional bicycle rear suspension systems can encounter problems when a rider's pedaling action interferes with suspension movement. Likewise, suspension movement can interfere with a rider's pedaling in some rear suspension system designs. Further, many suspension systems are difficult to adjust.

Accordingly, there is a need for a bicycle suspension system and frame design that has adequate shock absorbing capability without hindering the speed, handling, or aerodynamics of the bicycle. There is also a need for a bicycle suspension system and frame design that does not affect and is not affected by the chain's length or the pedaling action of the bicycle. There is also a need for a bicycle suspension system and frame that is easily adjustable and repairable. Finally, there is a need for a bicycle suspension system and frame design that is strong and safe for a rider. The present invention is directed toward solving the above identified problems.

SUMMARY OF INVENTION

The present invention constitutes a bicycle frame with an improved suspension system. The bicycle frame may include an adjustable dropout assembly that provides adequate shock absorption without affecting or being affected by the chain length or the pedaling action of the bicycle. The bicycle frame may include a uni-axis system that increases the efficiency and performance of the bicycle while eliminating lateral movement found in traditional frames. The bicycle frame may also include a micro-adjustable suspension system that allows the rider to easily adjust the suspension of the frame to precise measurements. The bicycle frame of the present invention further allows for easy changes in the size of the rear wheel of the bicycle.

These and other objects and advantages of the invention will become apparent from the following detailed description of the preferred embodiment of the invention.

Both the foregoing general description and the following detailed description are exemplary and explanatory only and are intended to provide further explanation of the invention as claimed. The accompanying drawings are included to provide a further understanding of the invention and are incorporated in and constitute part of this specification, illustrate several embodiments of the invention, and together with the description serve to explain the principles of the invention.

BRIEF DESCRIPTION OF THE DRAWINGS

FIG. 6A is a perspective view of a rear suspension component of a dropout assembly according to one embodiment of the present invention.

DETAILED DESCRIPTION OF THE EMBODIMENTS

Figure 1:
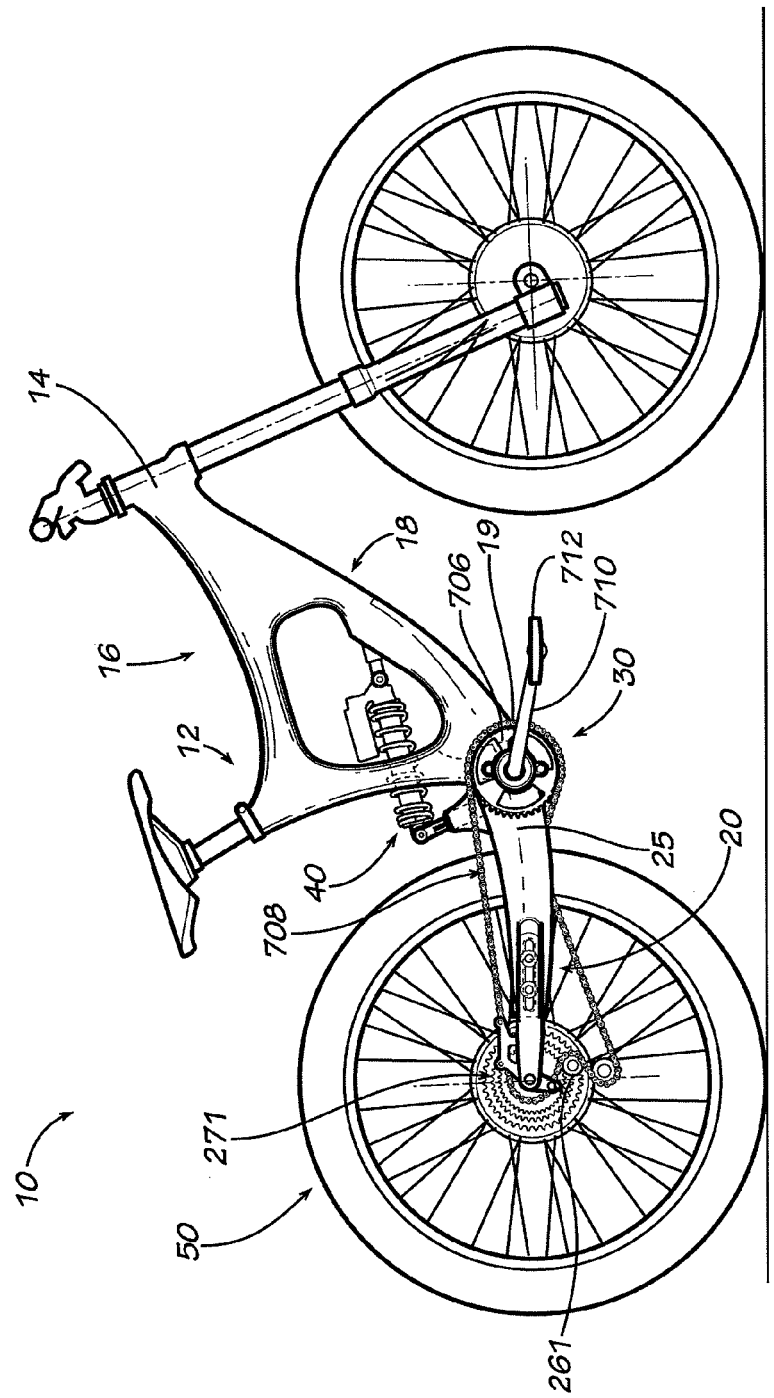
FIG. 1 is a side elevation view of a bicycle frame according to one embodiment of the present invention.

Referring to FIG. 1, the present invention is directed to a bicycle frame 10 that employs an adjustable dropout assembly 20 that provides shock absorption without affecting or being affected by the chain's length or the pedaling action of the bicycle. In addition, the present invention is directed to a uni-axis system 30 that increases the efficiency and performance of the bicycle frame 10. The bicycle frame 10 also employs a micro-adjustable suspension system 40 that allows a rider to easily and quickly adjust the clearance of the bicycle frame 10 and the travel of the dropout assembly 20 of the frame 10.

As shown in FIG. 1, the bicycle employs a frame 10 that includes a seat tube 12 and a head tube 14 connected by a cross tube 16. A down tube 18 extends from the head tube 14 to the bottom of the seat tube 12 to form a bottom bracket frame portion 19, discussed in more detail below. The dropout frame 20 of the frame 10 has a rear suspension arm 25, discussed in more detail below. The bottom bracket 19 receives and pivotably retains the rear suspension arm 25, via the uni-axis system 30. The micro-adjustable suspension system 40 interconnects the rear suspension arm 25 and the down tube 18, discussed in more detail below. The rear suspension arm 25 of the dropout assembly 20 retains the rear wheel 50 of the bicycle. While FIG. 1 illustrates a bicycle frame 10 configured for downhill racing, components of this invention may be incorporated in a variety of bicycles, including, but not limited to, BMX, fixed gear track, road racing, mountain, jumping, touring, and other bicycle types.

FIGS. 2-10 illustrate the dropout assembly 20, which includes the rear suspension arm 25, a rear suspension/chainstay component 100, a removable dropout component 200, and a securing component 300. The combination of the chainstay component 100, the removable dropout component 200, and the securing component 300 provides a micro-adjustable wheel base for the bicycle frame 10 depending on the needs of the cyclist. In addition, the dropout assembly 20 increases the strength and durability of the bicycle frame 10. These and other benefits will be discussed in detail below.

Figure 2:
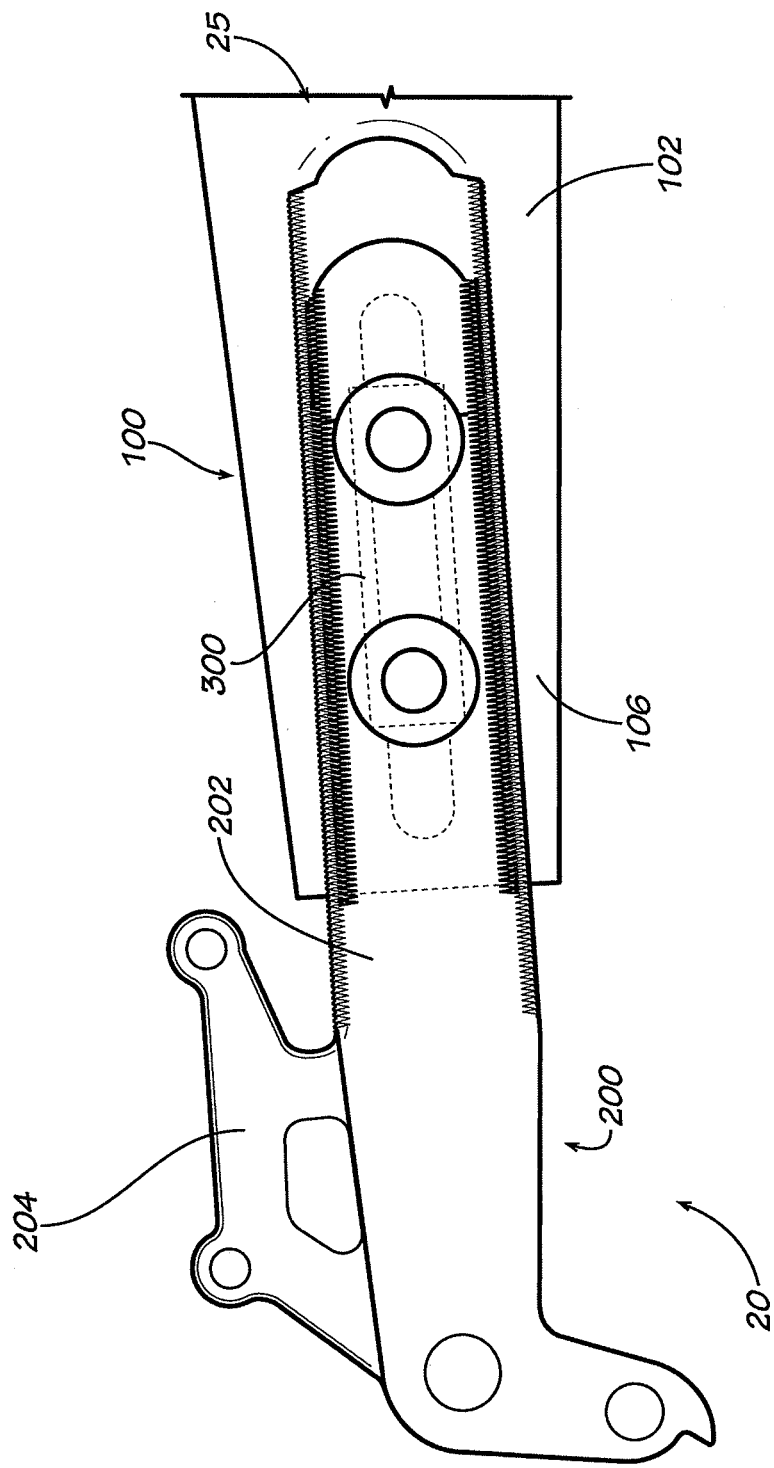
FIG. 2 is a side detailed view of a dropout assembly of the bicycle frame of FIG. 1 according to one embodiment of the present invention.
Figure 3:
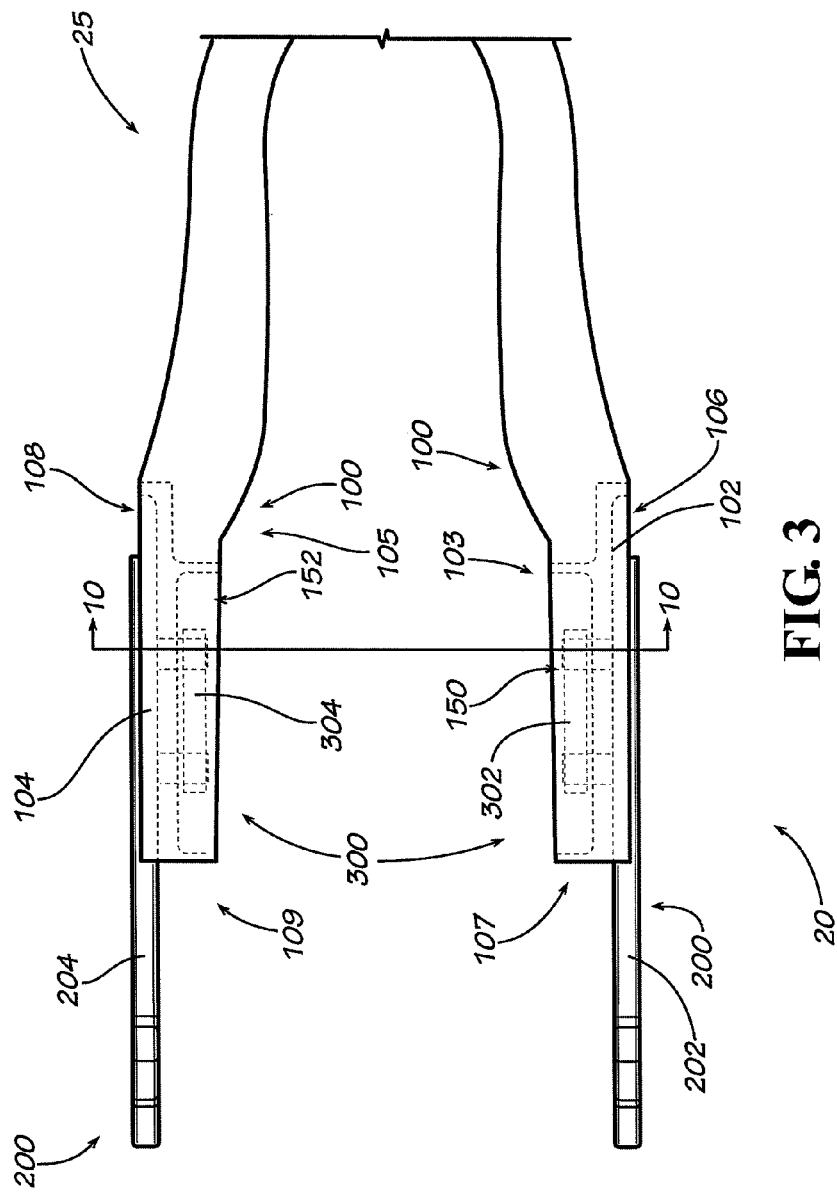
FIG. 3 is a top detailed view of the dropout assembly of FIG. 2.
Figure 5:
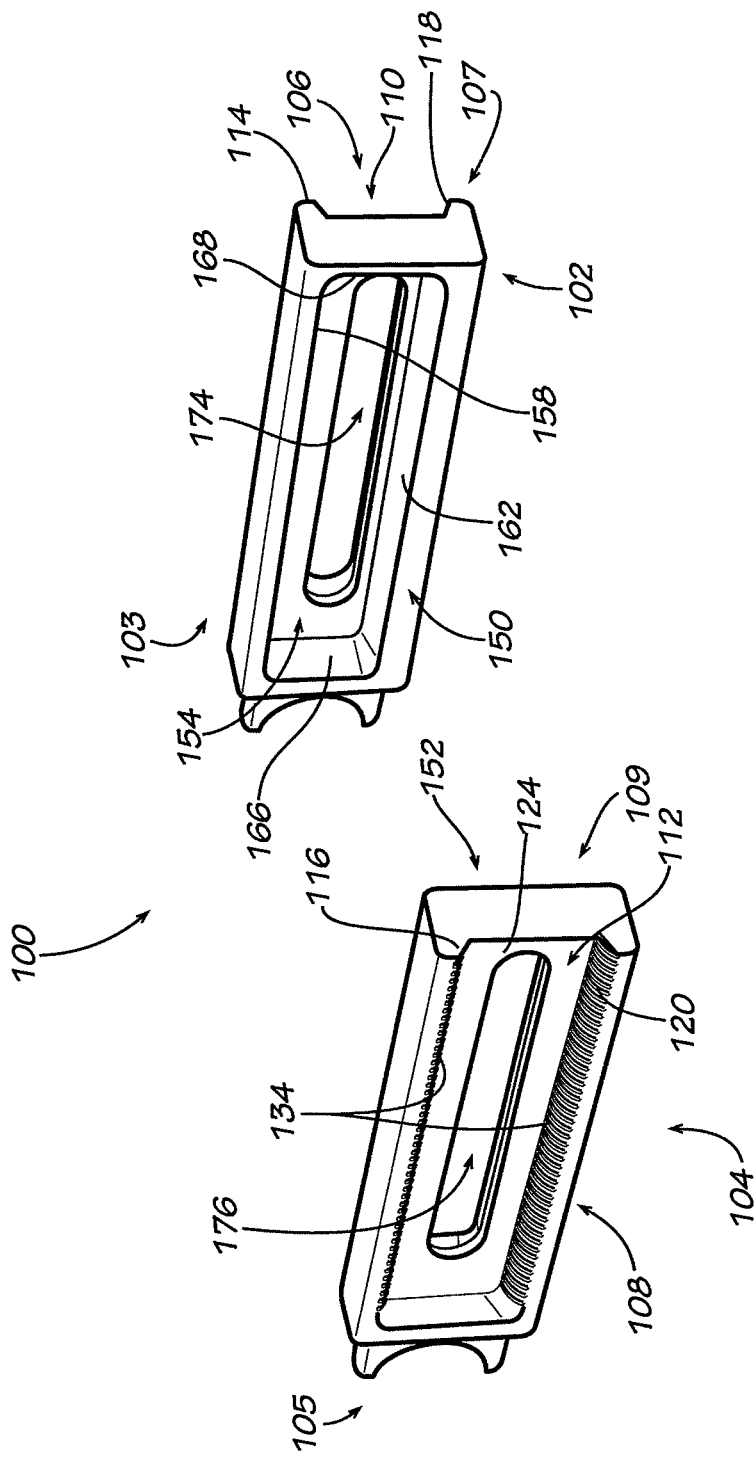
FIG. 5 is a perspective view of a rear suspension component of the dropout assembly of FIG. 2.
Figure 6:
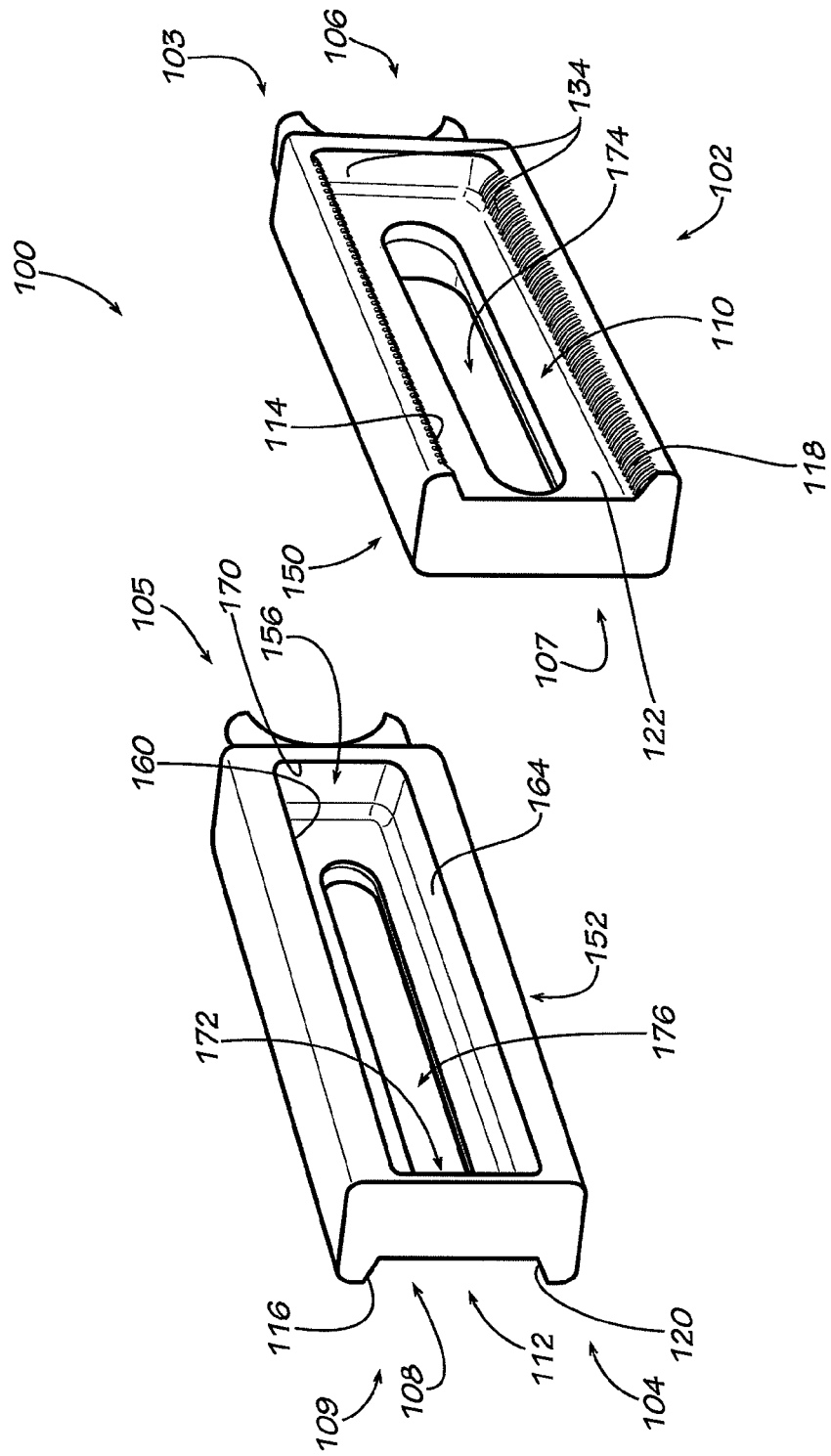
FIG. 6 is another perspective view of the rear suspension component of FIG. 5.

As shown in FIGS. 2-3, the rear suspension/chainstay component 100 is connected to the rear suspension arm 25 of the bicycle frame 10. The rear suspension/chainstay component 100 comprises chainstay arms 102, 104. The chainstay arms 102, 104 have suspension ends 103, 105 and wheel ends 107, 109 (FIGS. 5 and 6). The chainstay arms 102, 104 are connected to the rear suspension arm 25 at the suspension ends 103, 105, with the wheel ends 107, 109 opposite the rear suspension arm 25.

Figure 10:
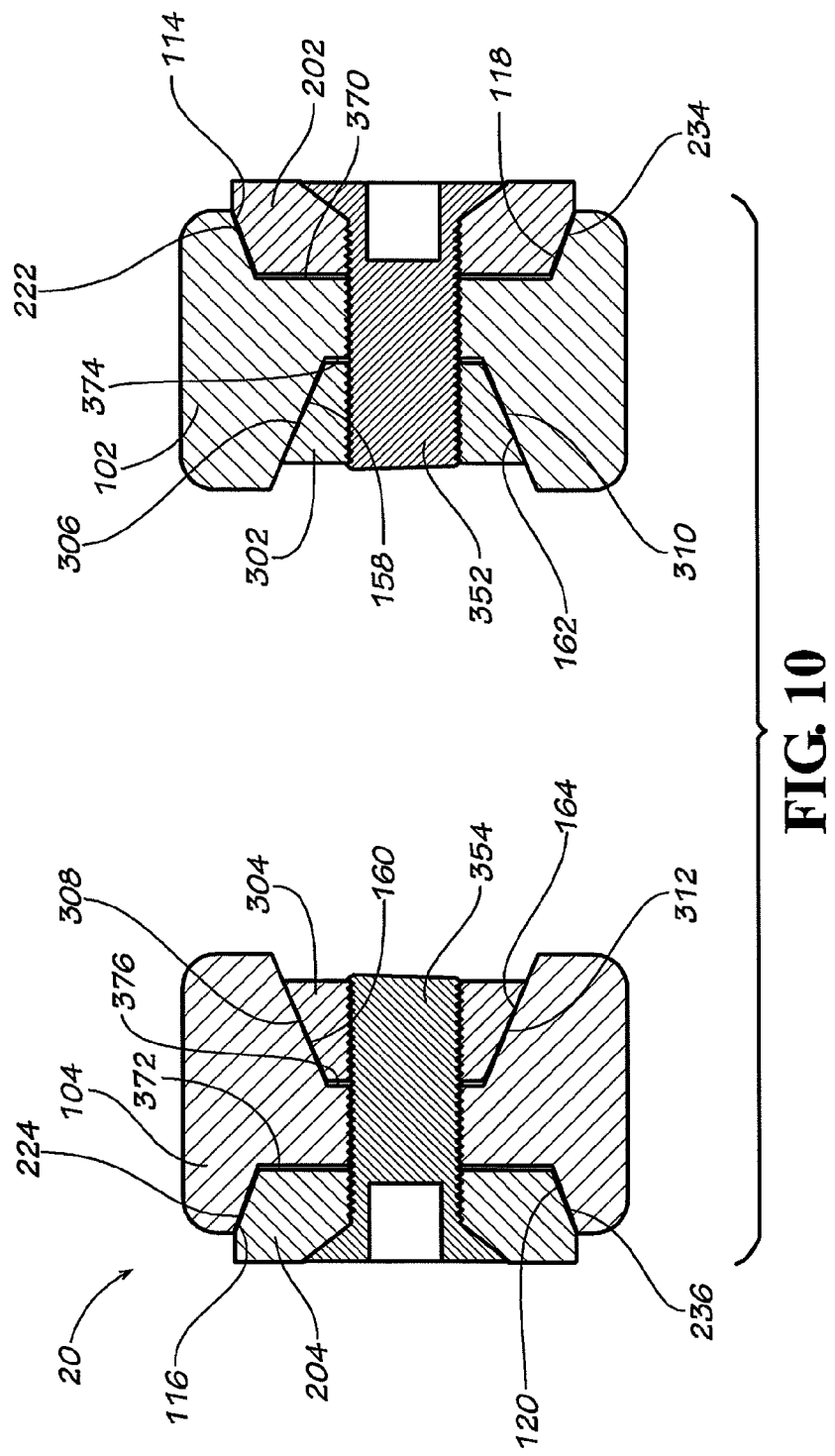
FIG. 10 is a cross-sectional view of the dropout assembly of FIG. 2 along line 10-10 of FIG. 3.

As illustrated in FIGS. 3-6, the chainstay arms 102, 104 have an exterior side 106, 108 and an interior side 150, 152. The chainstay arms 102, 104 are arranged to have interior sides 150, 152 facing each other when connected to the rear suspension arm 25 (FIG. 3). The exterior sides 106, 108 include a recessed portion 110, 112. The recessed portions 110, 112 include upper edges 114, 116 and lower edges 118, 120 that surround flat surfaces 122, 124 of the exterior sides 106, 108. The recessed portions 110, 112 are open at the wheel ends 107, 109 and are formed to receive the removable dropout component 200 of the dropout assembly 20, discussed in detail below. As shown in FIGS. 5, 6 and 10, the orientation of the upper edges 114, 116, flat surfaces 122, 124, and the lower edges 118, 120 gives the recess portions 110, 112 a wedge-shape, the importance of which is discussed below. Returning to FIGS. 5 and 6, the upper edges 114, 116 and the lower edges 118, 120 may include ratchets/teeth 134.

The teeth 134 assist in the micro-adjustability of the wheel base, as discussed in detail below.

With continued reference to FIGS. 5 and 6, the interior sides 150, 152 of the chainstay arms 102, 104 include a recessed portion 154, 156 surrounded by upper edges 158, 160, lower edges 162, 164, and side edges 166, 168 (FIG. 5), 170, 172 (FIG. 6) configured to receive the securing component 300. The upper edges 158, 160 and the lower edges 162, 164 are chamfered as shown in FIGS. 5-6 and 10, giving the interior recess portions 154, 156 a wedge shape. Apertures 174, 176 extend through the chainstay arms 102, 104 from the recess portions 110, 112 of the exterior sides 108, 110 to the recess portions 154, 156 interior sides 150, 152. As shown in FIGS. 5-6, the chainstay arms 102, 104 have only one elongated aperture 174, 176 each. In other embodiments of the present invention, however, the chainstay arms 102, 104 may have a plurality of apertures.

Further, while the current embodiment of the rear suspension/chainstay component is connected to a single rear suspension arm 25, the chainstay component may be used with other rear suspension types. For example, as shown in FIG. 6A, a chainstay component 1100 may include upper brackets 1180, 1182 on the chainstay arms 1102, 1104 to be used with a triangle-based rear suspension.

Figure 7:
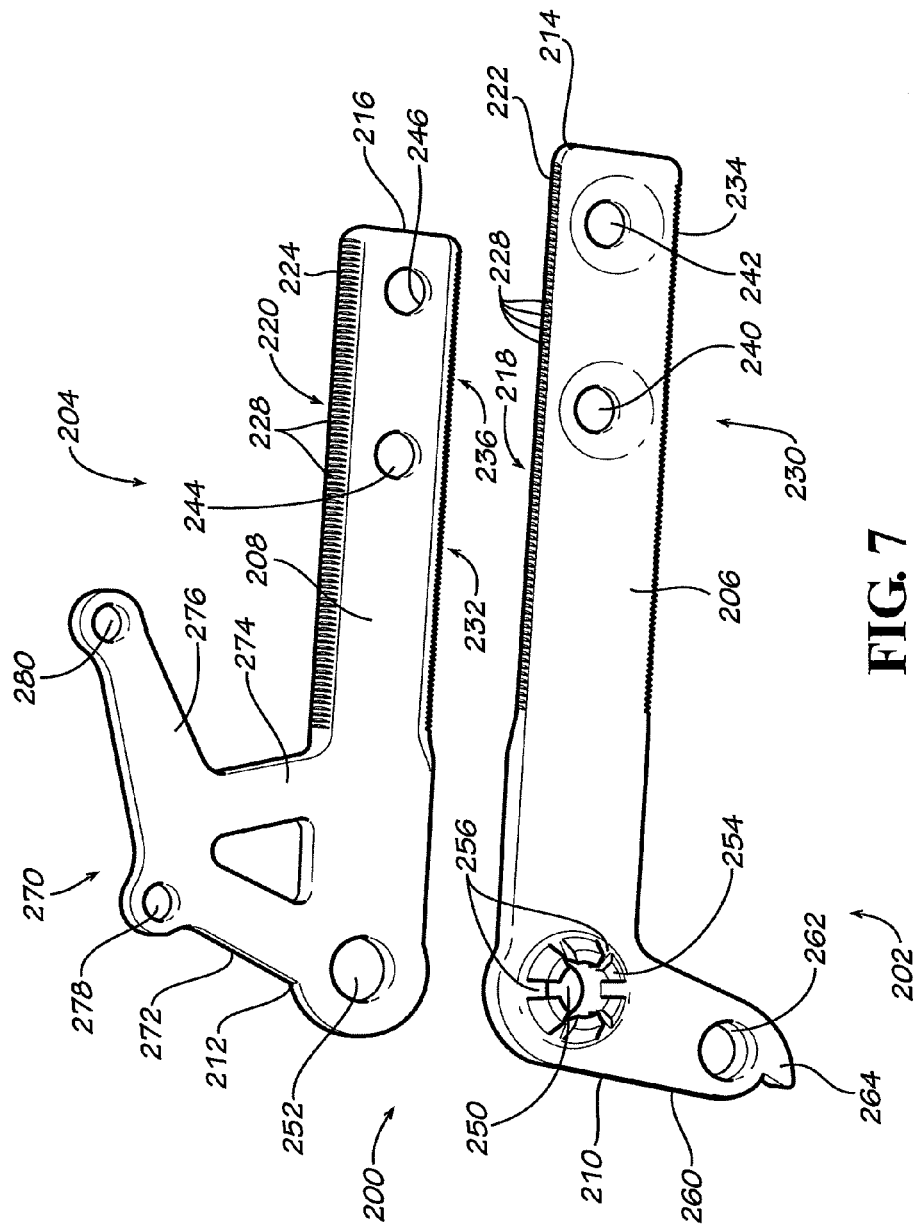
FIG. 7 is a perspective view of dropout components of the dropout assembly of FIG. 2.
Figure 8:
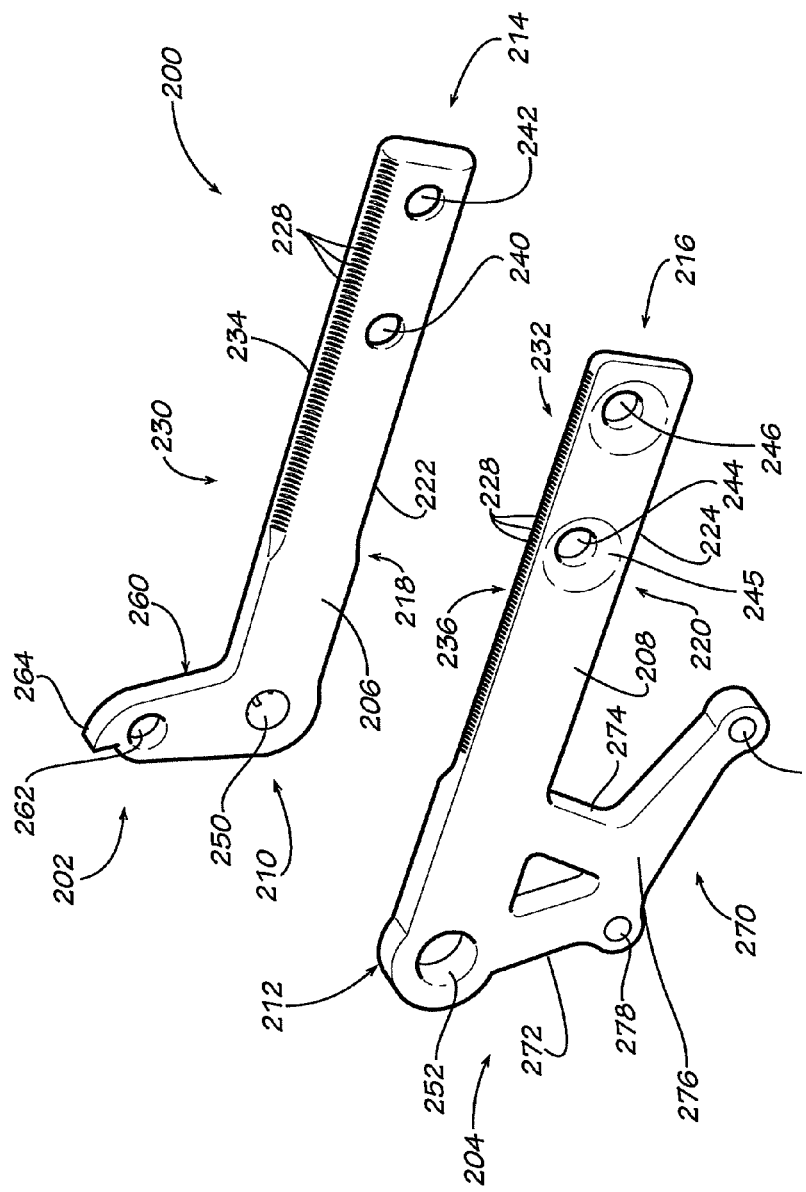
FIG. 8 is another perspective view of the dropout components of FIG. 7.

FIGS. 7-8 illustrate the removable dropout component 200 of the dropout assembly 20. The removable dropout component 200 includes two dropout arms 202, 204. The dropout arms 202, 204 correspond to the chainstay arms 102, 104 (FIGS. 5 and 6) of the rear suspension/chainstay component 100 of the dropout assembly 20. The two dropout arms 202, 204 are formed from materials that can withstand the constant impact that comes from dirt jump biking and downhill racing. For example, the dropout arms 202, 204 may be made from high grade aluminum, such as aluminum 7075. The dropout arms 202, 204, however, are not limited to such materials. The dropout arms 202, 204 may be made from, but are not limited to, other aluminum grades (i.g, 7005), steel, carbon fiber, titanium, other metal alloys, and other composite materials such as aryamid fibers (Kevlar) and the like. In any event, the material from which the dropout arms 202, 204 are formed should have similar strength properties as exhibited in the material used in other parts of the bicycle frame 10, including the chainstay arms 102, 104.

As shown in FIGS. 7-8, the dropout arms 202, 204 comprise longitudinal bodies 206, 208 having wheel ends 210, 212 and frame ends 214, 216, respectively. The longitudinal bodies 206, 208 further comprise top edges 218, 220 and bottom edges 230, 232, each with corresponding chamfered surfaces 222, 224, 234, 236. The chamfered surfaces 222, 224, 234, 236 match the upper edges, 114, 116 and the lower edges 118, 120 of exterior recess portions 110, 112 of the chainstay arms 102, 104 as shown in FIG. 10. In addition, the chamfered surfaces 222, 224, 234, 236 include ratchets/teeth 228 that match the ratchets/teeth 134 of the chainstay arms 102, 104 (FIGS. 5 and 6).

With continuing reference to FIGS. 7 and 8, securing apertures 240, 242, 244, 246 are found at the frame ends 214, 216 of the drop out arms 202, 204. The securing apertures 240, 242, 244, 246 are configured to receive and retain fastening means, discussed in more detail below. As shown in FIGS. 7-8, the apertures 240, 242, 244, 246 narrow from one side to the other of the dropout arms 202, 204. While dropout arms 202, 204 of the current embodiment have two apertures each, the number of apertures for the dropout arms can vary in other embodiments. In other embodiments, the width of the apertures 240, 242, 244, 246 may be uniform. Wheel apertures 250, 252 are located at the wheel ends 210, 212 of the dropout arms 202 and 204. The wheel apertures 250, 252 are configured to receive an axle of the rear wheel 50. A raised surface 254 surrounding the wheel aperture 250 extends from one dropout arm 202. Slots 256 are positioned throughout the raised surface 254, and may be configured to hold a securing pin that retains the axle of the wheel 50 in place.

Figure 11:
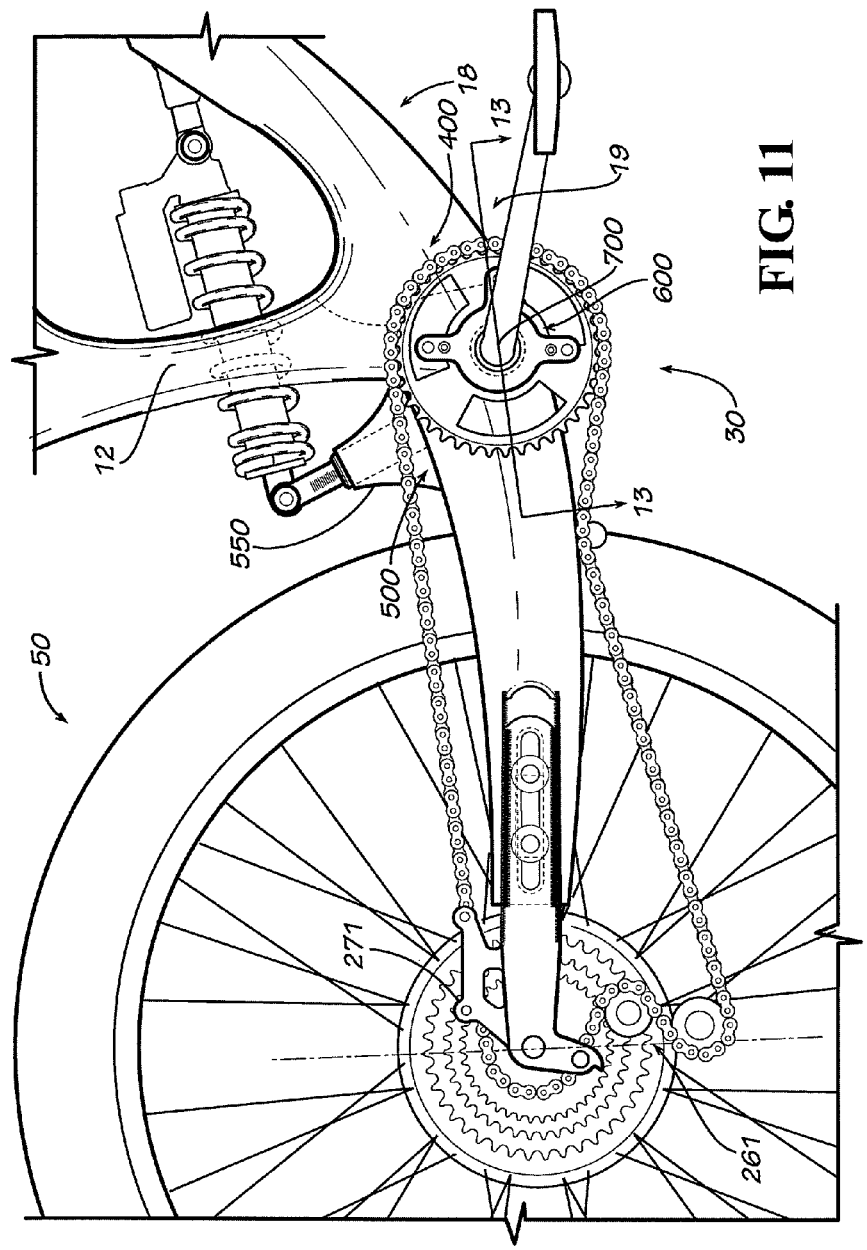
FIG. 11 is a partial detailed view of a uni-axis system of the bicycle frame of FIG. 1.

The dropout arms 202, 204 have means to attach gears, a derailleur, and rear wheel brakes. One dropout arm 202 includes a derailleur/gear mount 260 at the wheel end 210. The derailleur/gear mount 260 includes an aperture 262 to receive a component of a derailleur 261 (FIGS. 1 and 11). The derailleur mount 260 also includes a lip portion 264 that may act as a rotational stop for the derailleur 261. The other dropout arm 204 includes a rear wheel disc brake mount 270 at the wheel end 212 for a rear wheel disc brake 271 (FIGS. 1 and 11). The rear wheel disc brake mount 270 is connected to the wheel end 212 of the dropout arm 204 by supporting arms 272, 274, and includes a mounting arm 276 with multiple securing apertures 278, 280. While they may include other additional configurations and components, it is preferable for the derailleur mount 260 and the rear wheel disc brake mount 270 to be configured to receive and retain industry standard derailleurs and brakes calipers respectively.

Figure 4:
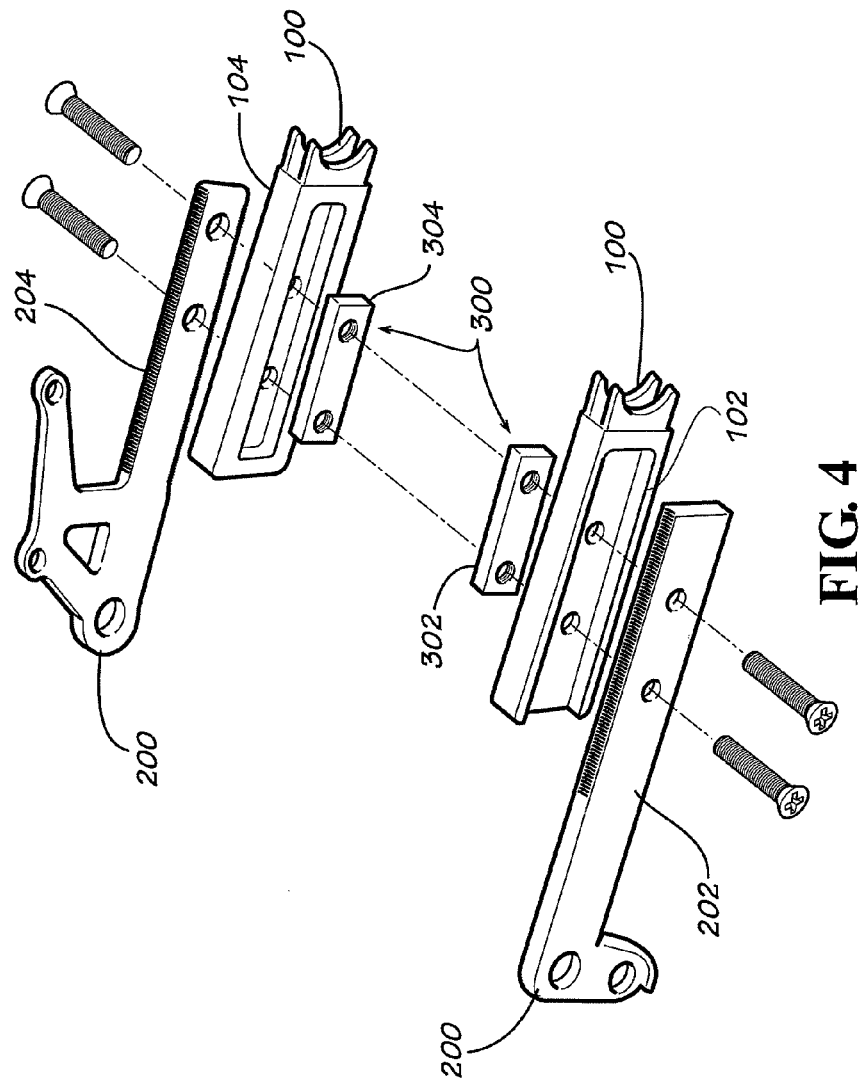
FIG. 4 is an exploded view of the dropout assembly of FIG. 2.
Figure 9:
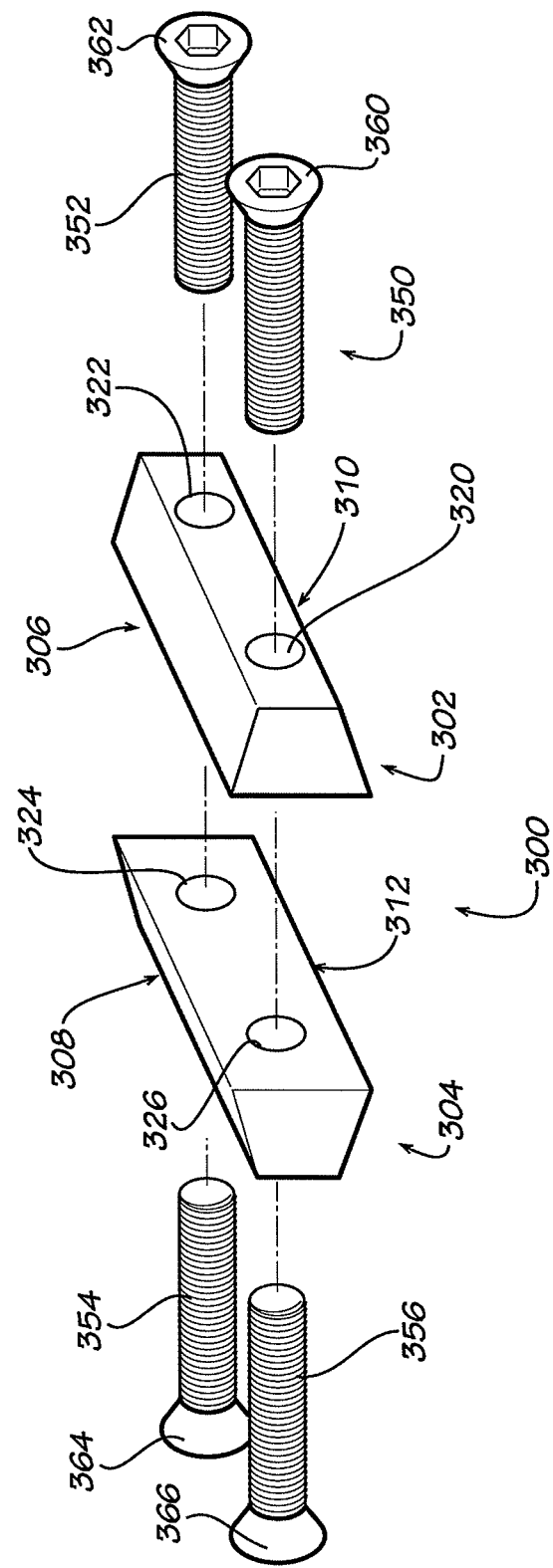
FIG. 9 is a perspective view of securing components of the dropout assembly of FIG. 2.

Turning to FIG. 9, the securing component 300 removably attaches the dropout component 200 to the rear suspension component 100 of the dropout assembly 20. The securing component 300, through its interaction with the rear suspension components, also limits the range of lateral movement of the dropout component 200. The securing component 300 comprises two sliding plates 302, 304. The sliding plates 302, 304 are configured to be received by the recessed portions 154, 156 found on the interior sides 150, 152 of the chainstay arms 102, 104 (FIGS. 4, 5, and 6). The length of the sliding plates 302, 304 is less than the length of the recessed portions 154, 156 of the chainstay arms 102, 104.

The sliding plates 302, 304 include top edges 306, 308 and bottom edges 310, 312 that slide along the top edges 158, 160 and lower edges 162, 164 of the recessed portions 154, 156 of the chainstay arms 102, 104. The top edges 306, 308 and the bottom edges 310, 312 are chamfered, configuring the sliding plates 302, 304 to have a wedge shape that matches and engagees the angle surfaces of the top edges 158, 160 and bottom edges 162, 164 of the recesses 154, 156 of the rear suspension component 100 as shown in FIG. 10.

The sliding plates 302, 304 may also include securing apertures 320, 322, 324, 326 configured to receive fasteners 350, 352, 354, 356. The number of securing apertures 240, 242, 244, 246 320, 322, 324, 326 in each sliding plate 302, 304 should equal the number of securing apertures of the sliding plates 302, 304 found in each dropout arm 202, 204. In addition, the apertures 320, 322, 325, 326 are spaced apart at the same distance found between the securing apertures 240, 242, 244, 246 of the dropout arms 202, 204. The fasteners 350, 352, 354, 356 are configured to be received by both the securing apertures 320, 322, 324, 326 of the sliding plates 302, 304 and securing apertures 240, 242, 244, 246 of the dropout arms 350, 352, 354, 356, 202, 204.

The present invention may employ a variety of fasteners to secure the sliding plates 302, 304 to the dropout arms 202, 204. For example, the fasteners 350, 352, 354, 356 may comprise thread bolts and the securing apertures 320, 322, 324, 326 of the sliding plates 302, 304 may be threaded to correspond to threading found on the fasteners 350, 352, 354, 356. Also, as shown in FIG. 9, the fasteners 350, 352, 354, 356 have angled heads 360, 362, 364, 366 that correspond in shape to the interior surfaces 241, 243, 245, 247 of the apertures 240, 242, 244, 246 of the dropout arms 202, 204. In other embodiments, the fasteners 350, 352, 354, 356 may be a combination of nuts and bolts.

Turning to FIGS. 2-4 and 10, the dropout component 200 is secured to the rear suspension component 100 through the securing component 300 in the following manner. The frame ends 214, 216 of the dropout arms 202, 204 are inserted into the chainstay arms 102, 104 at the openings of the wheel ends 107, 109 of the recessed portions 110, 112 of the exterior sides 106, 108. The wheel ends 210, 212 of the dropout arms 202, 204 extend past the end of wheel ends 107, 109 of the chainstay arms 102, 104. The sliding plates 302, 304 are placed within the recessed portions 154, 156 of interior side 150, 152 of the chainstay arms 102, 104 with the fasteners 350, 352, 354, 356 inserted into the securing apertures 240, 242, 244, 246 of the dropout arms 202, 204 and the securing apertures 320, 322, 324, 326 of the sliding plates 302, 304 through the elongated apertures 170, 172 of the chainstay arms 102, 104. The dropout arms 202, 204 and the sliding plates 302, 304 should be secured to the point that ensures they are retained within their respective recesses without preventing the adjustment of positioning of the dropout arms 302, 304 along the chainstay arms 102, 104. Further, when secured to one another, the dropout arms 202, 204 and the chainstay arms 102, 104 are configured to have a small clearance between each other 370, 372, as shown in FIG. 10. In addition, the sliding plates 302, 304 and the dropout arms 202, 204 are configured to have a similar small clearance 374, 276 as well. While the dropout arms 202, 204 may travel along the exterior recesses 110, 112 of the chainstay arms 102, 104, the range of travel of the dropout arms 202, 204 is limited by the range of travel of the sliding plates 302, 304 within the recesses 154, 156 of the interior sides 150, 152 of the chainstays 102, 104. When the sliding plates 302, 304 reach the ends of their respective recessed portions 154, 156, the dropout arms 202, 204 cannot move any further in that direction.

The teeth 134 of the upper edges 114, 116 and the lower edges 118, 120 of the exterior recesses 110, 112 of the chainstay arms 102, 104 and the teeth 228 of the chamfered surfaces 222, 224, 234, 236 of the dropout arms 202, 204 work together to allow the micro-adjustability of the wheel base of the bicycle frame 10. As stated above, the dropout arms 202, 204 are configured to retain the rear wheel 50. The dropout arms 202, 204 are moved toward the rear suspension arm 25 to shorten the wheel base, or are moved away from the rear suspension 25 to increase the wheel base. The teeth 134 of the chainstay arms 102, 104 engage the teeth 228 of the dropout arms 202, 204 to allow a measured adjustment. Additionally, the teeth 134, 228 prevent the dropout arms 202, 204 from moving when the bicycle frame 10 is in use. The combined forces of the ground and the cyclist on the dropout arms via the rear wheel 50 and the frame keep the teeth 134 of the chainstay arms 102, 104 engaged with the teeth 228 of the dropout arms 202, 204, preventing the dropout arms 202, 204 from moving within the recesses 110, 112 of the chainstay arms 102, 104.

The dropout assembly 20 also allows a variety of different size wheels to be used on a single frame 10. Certain types of bicycle use require different types of wheels. For example, dirt jumping bicycles require a smaller size wheel, such as a 24 inch wheel. Long distance riding is benefited by using a larger wheel, for example a 29 inch wheel, because it decreases the rolling resistance and increases the ability to roll over terrain with less effort from the rider. Downhill and mountain cycling would benefit from a 26 inch wheel which maintains the maneuverability and short turning radiuses needed by such uses but without requiring the type of effort a rider would have to employ if a 24 inch wheel is used. Accordingly, the dropout arms 202, 204 can be moved closer or further away from the main portion of the frame to receive and retain various size wheels 50 based upon the rider's needs. The length of the chain 708 may or may not need to be adjusted, depending on whether the bicycle has a fixed gear configuration, whether the bicycle has a rear derailleur, and how much the wheel is adjusted.

In addition to providing micro-adjustability of the wheel base of the bicycle frame 10, the dropout assembly 20 absorbs more impact than a traditional rear suspension. Being a separate component from the frame 10, the dropout arms 202, 204 will absorb most of the impact/force before transferring the force to the chainstay arms 102, 104. In addition, as shown in FIG. 10, the wedge shaped portions of the dropout arms 202, 204, sliding plates 302, 304, and the recesses 110, 112, 154, 156 of the chainstay arms 102, 104 dissipates the force experienced by the remainder of the frame 10. In addition, the dropout arms 202, 204 may be engineered to fail before the frame 10, thereby protecting the frame 10 from damage. If the force from the impact is too great and compromises the integrity of the dropout arms 202, 204, the dropout arms 202, 204 can be easily replaced without having to replace the entire frame 10. The formation of the dropout assembly 20 increases the side to side stiffness of the bike as well by increasing the depth and thickness of the dropout components 202, 204.

In addition, since the dropout assembly 20 is configured to retain the brakes, derailleur, and gears (via the wheel end of one of the dropout arms 102, 104), the rear bicycle wheel can be removed and replaced without the need to adjust the bicycle chain (not shown). Similarly, the dropout assembly 20 ensures that the wheel alignment does not need to be adjusted each time a wheel 50 is removed or added; the rear wheel 50 may be removed without having to loosen the dropout arms 202, 204 or those components mounted to it, including the derailleur, gears, and brakes. This characteristic is highly desirable in bicycles used for racing purposes, saving significant time in replacing damaged rear tires.

FIGS. 11-13A illustrate the uni-axis system 30 of the bicycle frame 10 according to one embodiment of the present invention. The uni-axis system 30 includes a bottom bracket support fork 400, which is part of the bottom bracket frame portion 19, a pivoting end 500 of the rear suspension arm 25, a bottom bracket shell 600, and a crank set 700. The uni-axis system 30 allows the rear suspension arm 25 to pivot around the same axis as the crank set 700, eliminating the chain growth found in common frames. In addition to this benefit, the uni-axis system 30, and its components, provides a more laterally stiffer ride and increased handling, as discussed below.

As shown in FIGS. 11-13A, the bottom bracket support fork 400 is formed as a part of a bottom portion 19 of the frame 10. The bottom bracket support fork 400 includes a hollow interior 402, which is configured to retain other components of the uni-axis system 30. The bottom bracket support fork 400 includes a rear access opening 410. The rear access opening 410 can vary in height and width depending on the dimensions of the pivoting end 500 of the rear suspension arm 25 and the suspension arm's range of motion. The bottom bracket support fork 400 includes axis apertures 420, 422 oriented on opposite sides of the frame 400 and are configured to receive the bottom bracket shell 600 and other components. Securing mounts 424 may be associated around the perimeter of at least one of the axis apertures 420, 422, and are configured to mount and retain portions of the bottom bracket shell 600 and other bicycle components. The bottom bracket support fork 400 may also include a shock assembly opening 450, discussed in further detail below.

Figure 13:
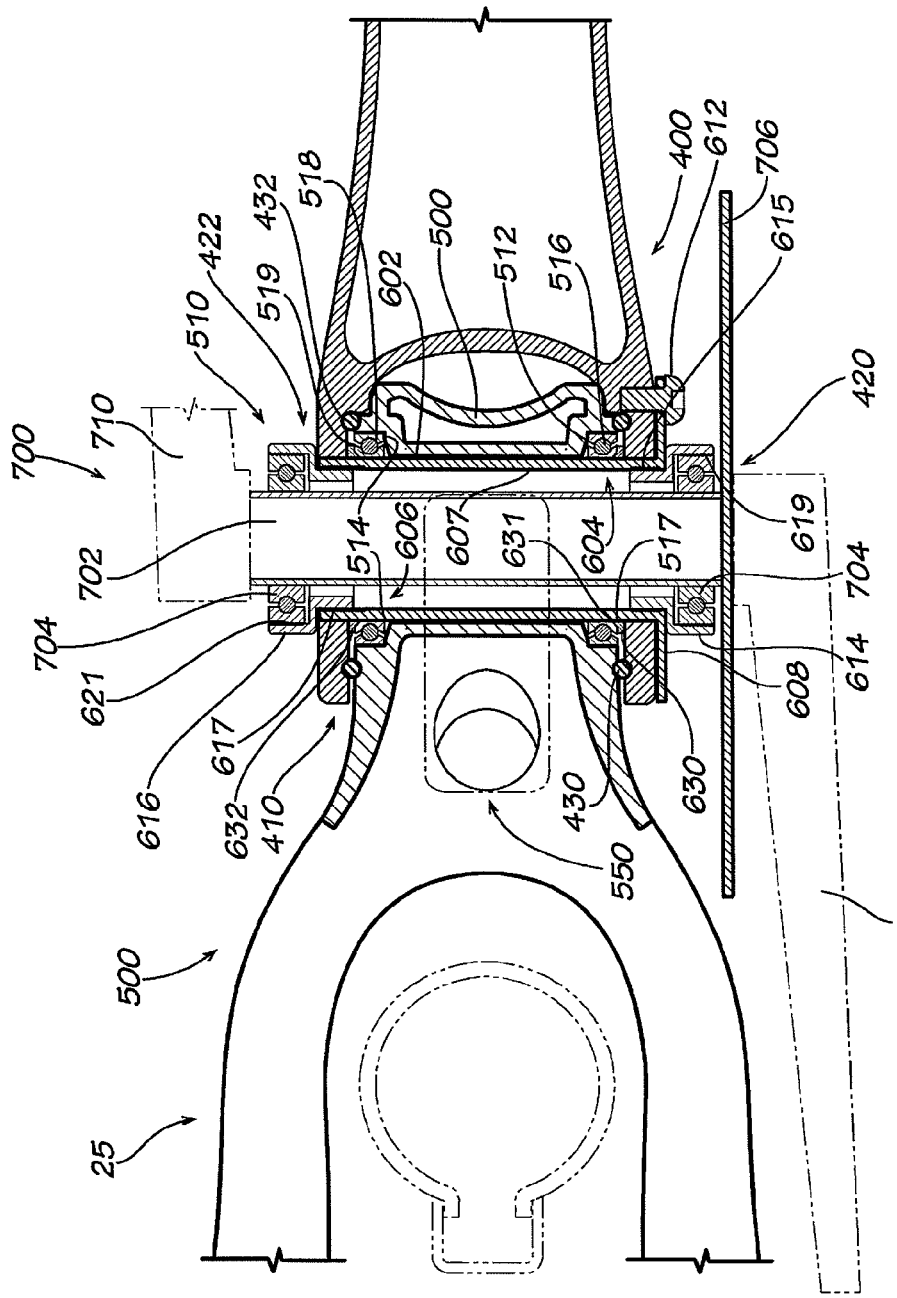
FIG. 13 is a cross-sectional view of the uni-axis system along line 13-13 of FIG. 11.
Figure 13A:
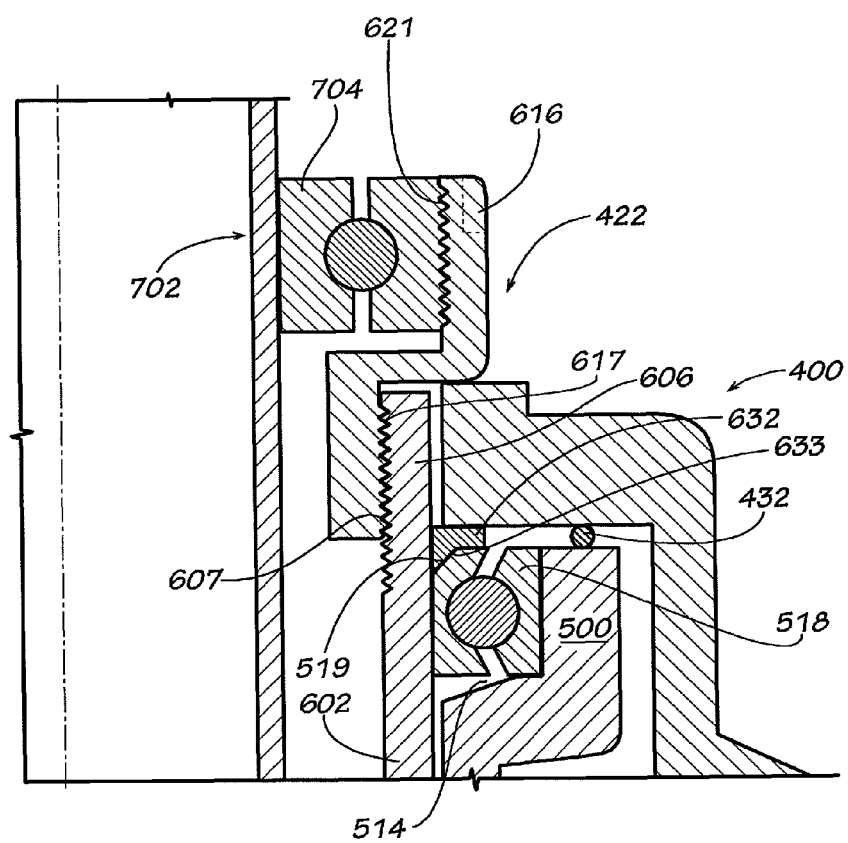
FIG. 13A is a detailed partial view of FIG. 13.

The pivoting end 500 of the rear suspension arm 25 is configured to be received through the rear access opening 410 of the bottom bracket support fork 400. The pivoting end 500 is oriented opposite of the rear suspension/chainstay component 100 of the dropout assembly 20. The pivoting end 500 includes a channel 510 that runs perpendicular to the length of the suspension arm 25. The diameter of the channel 510 substantially equals the diameter of the axis apertures 420, 422. Recesses 512, 514 may be found at each end of the channel 510. The recesses 512, 514 may be configured to receive and retain pivot bearings 516, 518. The pivot bearings 516, 518 may include chamfered surface 517, 519, as shown in FIGS. 13 and 13A. In one embodiment of the present invention, the pivot bearings 516, 518 are of a large diameter, preferably 1.5 inches or more. In other embodiments of the present invention, the diameter of the pivot bearings 516, 518 may vary in size. In addition, in other embodiments of the present invention, the pivot bearings may be mounted within the bottom bracket support fork 400. A rear suspension mount 550 is attached to the upper surface of the pivoting end 500 of the rear suspension arm 25, discussed in more detail below.

As stated above, the bottom bracket support fork 400 is configured to receive the pivoting end 500 of the rear suspension arm 25 through a rear access opening 410 and retain the rear suspension arm 25 within the hollow interior 402. In other embodiments of the present invention, the arrangement may be made in an opposite fashion, with the rear suspension arm configured to receive retain the bottom portion 19 of the frame 10 through an access opening and retain the bottom portion 19 within a hollow interior.

Figure 12:
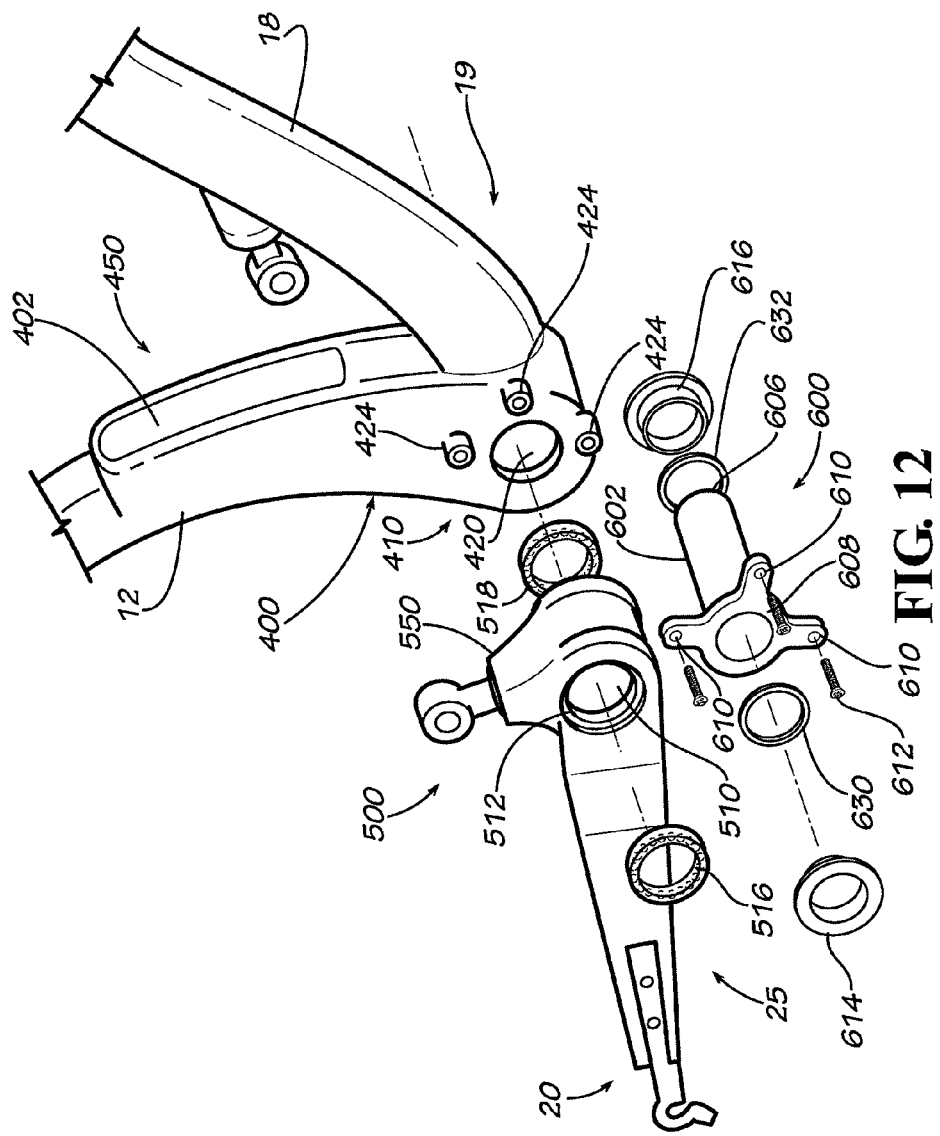
FIG. 12 is an exploded view of the uni-axis system of FIG. 11.

The bottom bracket shell 600 is configured to be received by the channel 510 of the rear suspension arm 25 and the axis openings 420, 422 of the bottom bracket support fork 400. The bottom bracket shell 600 comprises a hollow tube body 602 with a first end 604 and a second end 606. The diameter of the hollow tube body 602 should be slightly smaller than that of the channel 510 of the rear suspension arm 25 and the axis apertures 420, 422 of the bottom bracket support fork 400. The interior surfaces 607 of the hollow tube body 602 may be threaded. A securing flange 608 is found at one end of the bottom bracket shell 600. The securing flange 608 include securing apertures 610 configured to receive fastening means 612 to secure bottom bracket shell 600 to the bottom bracket support fork 400. As shown in FIG. 12, bolts 612 are used to engage the securing mounts 424 of the bottom bracket support frame 400. However, other embodiments of the present invention may utilize various fastening means and methods, including, but not limited to, set screws and the like.

Bottom bracket cups 614, 616 are associated with each end 604, 606 of the tube body 602. The bottom bracket cups 614, 616 are coupled to the ends 604, 606 of the tube body 602 by various methods known to those skilled in the art. For example, as shown in FIGS. 13 and 13A, the bottom bracket cups 614, 616 have threaded exterior surfaces 615, 617 configured to engage the threads of the interior surface 607 of the tube body 602. The interior surface 619, 621 of the bottom bracket cups 614, 616 may also be threaded for use with the crank set 700.

The bottom bracket shell 600 may also include washers 630, 632 that are placed on the exterior of the tube body 602. The washers 630, 632 may include chamfered surfaces 631, 633 that correspond to the chamfered surface 517, 519 of the pivot bearings 516, 518 of the pivoting end 500 of the rear suspension arm 25.

The bottom bracket shell 600 is configured to retain portions of the crank set 700, as shown in FIGS. 13 and 13A. The bottom bracket shell 600 is configured to receive any standard crank set 700. Specifically, the tube body 602 is configured to retain a spindle 702 of the crank set 700, while the bottom bracket cups 614, 616 are configured to retain bearings 704 that surround the spindle 702. The crank set 700 includes a chain ring 706, a chain 708, cranks 710, and pedals 712 (FIGS. 1 and 11).

To assemble the uni-axis system 30, the pivot bearings 516, 518 are placed in the recesses 512, 514 at the pivoting end 500 of the rear suspension arm 25, with the chamfered surfaces 517, 519 facing outward. The pivoting end 500 of the support arm 25 is then inserted through the rear access opening 410 of the bottom bracket support fork 400. The channel 510 of the pivoting end 500 is aligned with the axis openings 420, 422 of the bottom bracket support fork 400, with the suspension mount 550 oriented on top of the pivoting end 500. As shown in FIGS. 13 and 13A, O rings 430, 432 may be placed between the pivoting end 500 and the bottom bracket support fork 400 to create a second seal.

A washer 630 is placed on the tube body 602 adjacent the securing flange 608, with the chamfered surface 631 opposite the flange 608 of the tube body. The tube body 602 of the bottom bracket shell 600 is inserted through one axis opening 420, into the channel 510 of the rear support arm 25 and then through the other axis opening 422, with the securing flange 608 adjacent the exterior of the first axis opening 420 and the second end 606 of the tube body 602 within the second axis opening 422. The other washer 632 is then placed on the second end 606 of the tube body 602, with the chamfered surface 633 aligned to engage the chamfered surface of one of the pivot bearings 518. The bottom bracket cups 614, 616 are then coupled to the ends 604, 606 of the tube body 602 through the various means discussed above. The bottom bracket shell 600 is then secured to the bottom bracket support fork 400 through the fastening means 612 engaging the securing apertures 610 and the securing mounts 424. Tightening the fastening means 612 eliminates any play within the components discussed above, bringing the chamfered surfaces 517, 519 of the pivot bearings 516, 517 together with the chamfered surfaces 631, 633 of the washers 630, 632.

The spindle 702 of the crank set 700 may then be inserted through the tube body 602 of the bottom bracket shell 600. Bottom bracket bearings 704 are then placed on opposite ends of the spindle 702 and engage the bottom bracket cups 614, 616 to retain the spindle 702 within the tube 602. The remaining components of the crank set 700 may then be assembled.

As assembled, the uni-axis system 30 provides many advantages over that of other bicycle frames. By having one single rotation point that is shared by the crank set 700 and the pivoting end 500 of the rear suspension arm 25, no chain growth occurs when the rear suspension arm 25 moves in a different rotational direction, caused by suspension movement, than that of the cranks 704. Further, the combination of chamfered surfaces 517, 519 of the pivot bearings 516, 518 together with the chamfered surfaces 631, 633 of the washers 630, 632 eliminate side play or movement along the axis.

In addition, using pivot bearings 516, 518 with large diameters that angularly engage the washers 630, 632 reduces suspension movement friction, provides a laterally stiffer connection between the rear suspension arm 25 and the frame 10, and does not require periodic greasing or maintenance. Also, the bottom bracket shell 600 is removable and allows easy inspection and replacement of any parts associated with the shell 600, including the rear suspension arm 25 and the crank set assembly 700.

Figure 14:
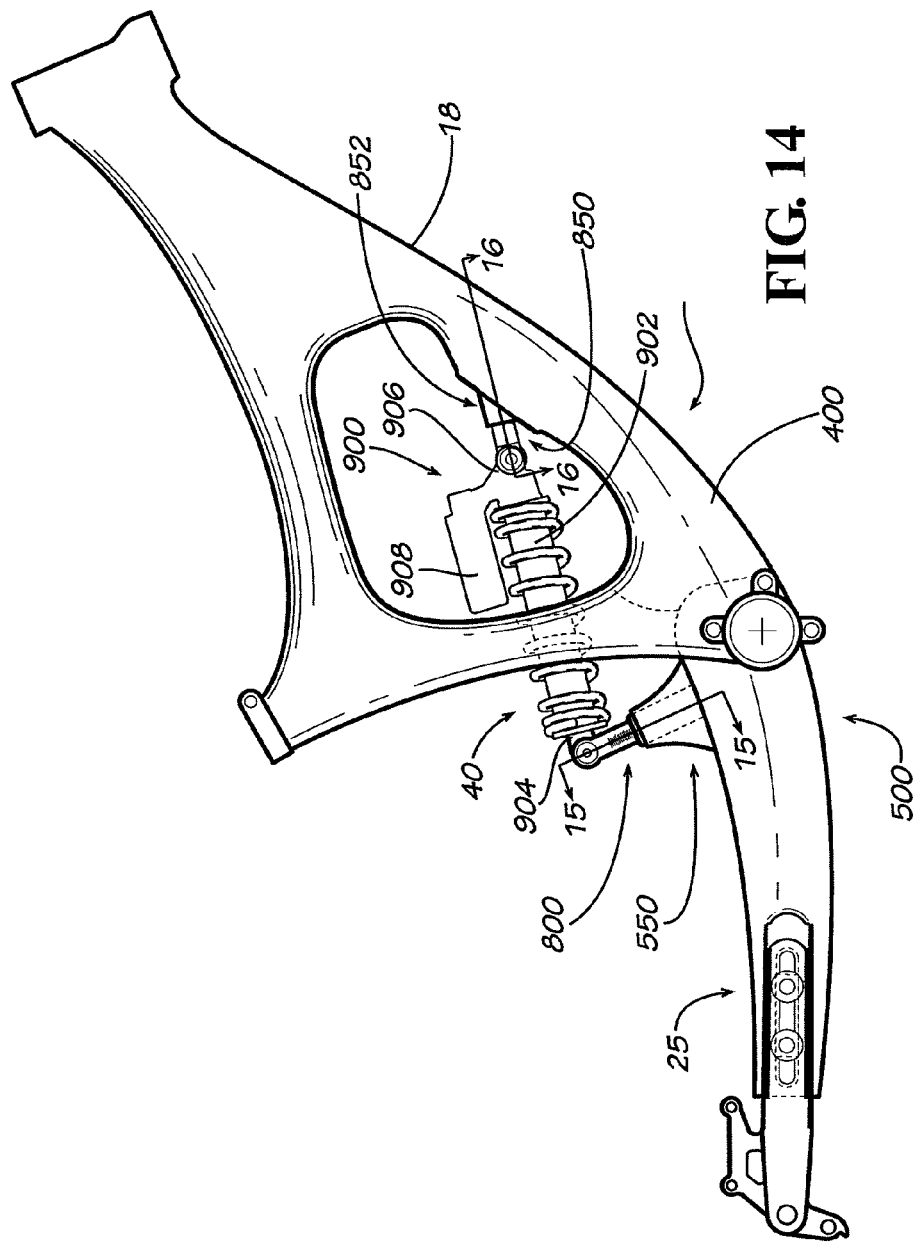
FIG. 14 is a detailed partial side view of a micro-adjustable suspension assembly of the bicycle frame of FIG. 1 according to one embodiment of the present invention.
Figure 15:
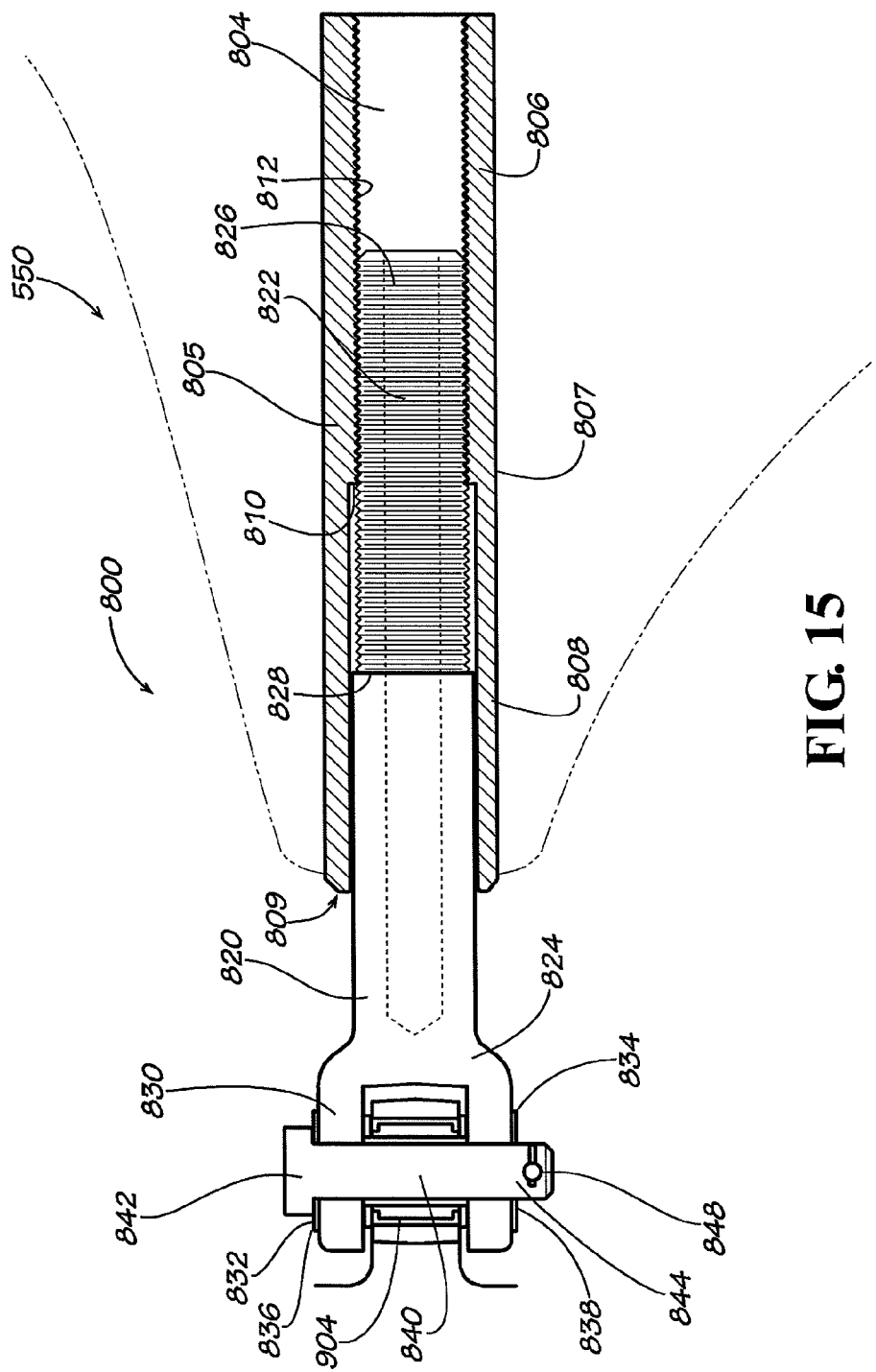
FIG. 15 is a cross-sectional view of a component of the micro-adjustable suspension assembly of FIG. 14 along line 15-15.

FIGS. 14-17 illustrate the micro-adjustable suspension system 40 of the bicycle frame 10 according to one embodiment of the present invention. The micro-adjustable suspension system 40 is configured to control the travel of the suspension and the clearance of the bottom of bracket frame support. The micro-adjustable suspension system 40 includes a lower micro-adjustable component 800 and an upper micro-adjustable component 850 connected by a shock assembly 900. As shown in FIGS. 14-15, the lower micro-adjustable component 800 is associated with the rear suspension arm 25. As shown in FIG. 14, the micro-adjustable component 800 includes a rear suspension mount 550 associated with the rear suspension arm 25. While the rear suspension mount 550 may be located at various positions along the rear suspension arm 25, it is preferable for the rear suspension mount 550 to be located approximate the top of the pivoting end 500 of the rear suspension arm 25 to ensure that the micro-adjustable suspension system 40 is not unnecessarily exposed to higher forces experienced closer to the axis of the rear wheel 50. The rear suspension mount 550 may be integrally formed with the rear suspension arm 25 or may be coupled to the rear suspension arm 25 through various means of fastening, including, but not limited to, welding, fasteners, adhesive bonding, and the like.

As shown in FIGS. 14-15, the rear suspension mount 550 includes a channel 804 with a lower end 806, a middle portion 807, and an upper end 808. The channel 804 is formed from a sleeve 805 that is inserted and secured to the rear suspension mount 550. In other embodiments of the present invention, the channel 804 can be integrally formed within the rear suspension mount 550. The upper end 808 of the channel 804 includes an opening 809 that provides access to the channel 804. The upper end 808 of the channel 804 is wider in diameter than the lower end 806 of the channel 804, the importance of which is discussed in detail below. The upper end 808 of the channel 804 terminates at a ledge 810 located approximately at the middle portion 807 of the channel 804. A threaded surface 812 runs from the ledge 810 through the lower end 808 of the channel 804. In the preferred embodiment, the threaded surface is a 16×1.5 millimeter ratio, which allows for a great amount of precision in adjustment. In other embodiments, larger or smaller ratios of various measuring units may be used.

The channel 804 is configured to retain an adjustable connecting rod 820. The connecting rod 820 includes a lower end 822 and an upper end 824. The lower end 822 of the connecting rod 820 includes a threaded exterior surface 826 that engages the threaded surface 812 of the channel 804. The threaded exterior surface 826 terminates at a ledge 828 that indicates the beginning of the upper end 824 of the connecting rod 820. The top of the upper end 824 includes a coupling mechanism 830. For example, as shown in FIGS. 14 and 15, the coupling mechanism 830 may be a clevis fastener 830. The clevis fastener 830 includes apertures 832, 834 configured to receive a pin 840. To prevent play between the apertures 832, 834 and the pin 840, bearings 836, 838 may be placed within the apertures 832, 834. The pin 840 includes a head 842 and a cotter pin end 844 that includes a cotter pin 848 that is received by an aperture within the pin end 844 (not shown, but occupied by cotter pin 848). The combination of the head 842 and the cotter pin 848 retains the pin 840 within the clevis fastener 830. While the present embodiment of the present invention utilizes a clevis fastener for the coupling mechanism 830, other embodiments may utilize other connecting devices, including, but not limited to, bolts, pins, and other devices capable of pivoting, the coupling mechanism should be configured to pivotally couple to the shock assembly 900, as discussed below.

Figure 16:
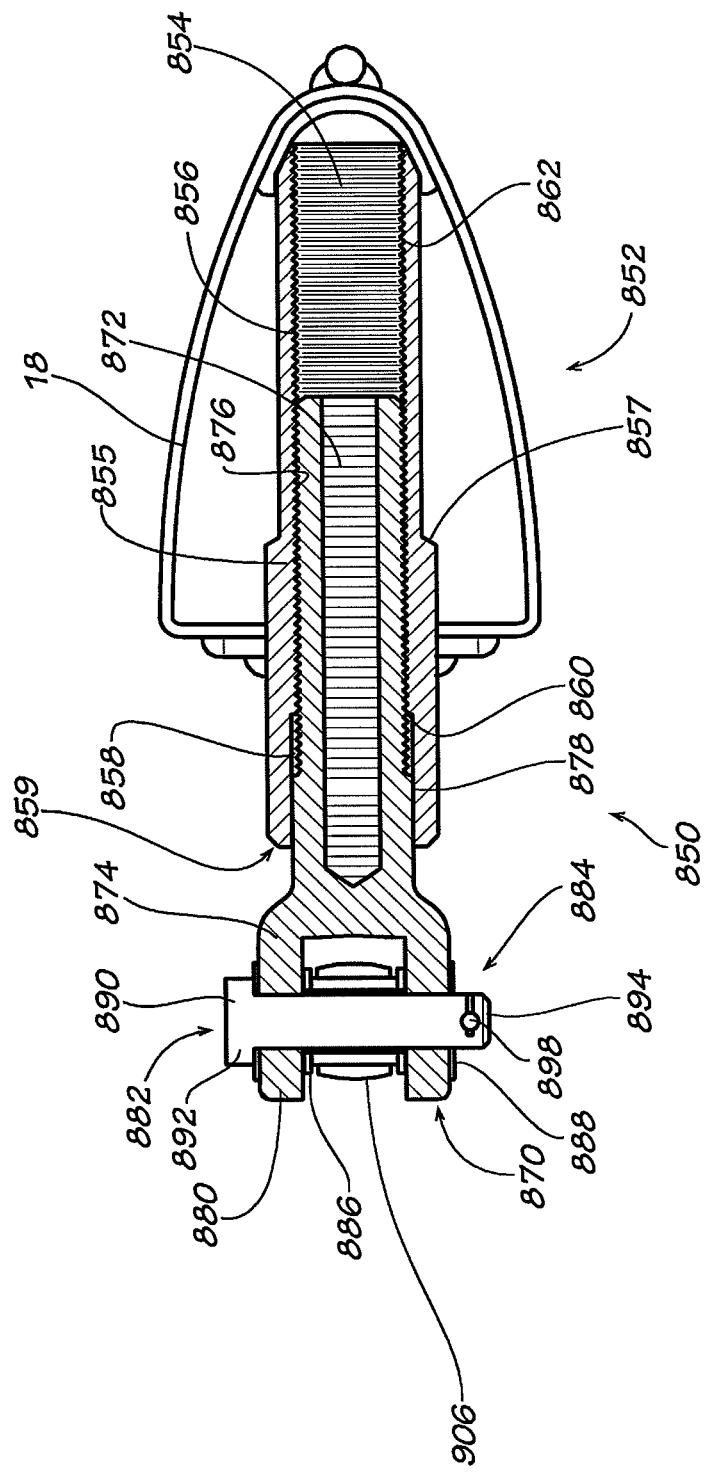
FIG. 16 is a cross-sectional view of a component of the micro-adjustable suspension assembly of FIG. 14 along line 16-16.

As shown in FIGS. 14 and 16, the upper micro-adjustable component 850 is associated with the down tube 18 of the bicycle frame 10. While the upper micro-adjustable component 850 can be associated with other tubes of the bicycle frame 10, including the seat tube 14 and the top tube 16, it is preferable for the upper micro-adjustable component 850 to be associated with the down tube 18 for strength and aerodynamic reasons. The upper micro-adjustable component 850 includes a down tube mount 852 integrally formed with the down tube 18. In other embodiments of the present invention, the down tube mount may be coupled to the down tube 18 through various means of fastening, including, but not limited to, welding, fasteners, adhesive bonding, and the like.

The down tube mount 852 includes a channel 854 with a lower end 856, a middle portion 857 and an upper end 858. As shown in FIGS. 14 and 16, the channel 854 is formed from a sleeve 855 that is inserted and secured to the down tube mount 852. However, in other embodiments of the present invention, the channel 854 may be integrally formed within the down tube mount 852. The upper end 858 of the channel 854 includes an opening 859 that provides access to the channel 854. The upper end 858 of the channel 854 is wider in diameter than the lower end 856 of the channel 854. The upper end 858 of the channel 854 terminates at a ledge 860 found at the middle 857 of the channel 854. A threaded surface 862 runs from the ledge 860 to the end of the lower end 858 of the channel 854.

The channel 854 is configured to retain an adjustable connecting rod 870 similar to the connecting rod 820 of the lower micro-adjustable component 800. The connecting rod 870 includes a lower end 872 and an upper end 874. The lower end 872 of the connecting rod 870 includes a threaded exterior surface 876 that engages the threaded surface 862 of the channel 854. The threaded exterior surface 876 terminates at a ledge 878 that indicates the beginning of the upper end 874 of the connecting rod 870. The top of the upper end 874 includes a coupling mechanism 880. As shown in FIGS. 14 and 16, the coupling mechanism 880 may be a clevis fastener 880 with apertures 882, 884 configured to receive a pin 890. The apertures 882, 884 may include bearings 886, 888. The pin 890 includes a head 892 and a cotter pin 894 end that includes a cotter pin 898 that is received by an aperture within the pin end 894 (not shown, but occupied by cotter pin 898). The combination of the head 892 and the cotter pin 898 retains the pin 890 within the clevis fastener 888. As discussed above, the coupling mechanism 880 may utilize a wide range of fastening devices that are known in the art, but it is preferred that the coupling mechanism 880 is configured to pivotably connect to the shock assembly 900.

The coupling mechanisms 830, 880 of the lower micro-adjustable component 800 and the upper micro-adjustable component 850 are configured to pivotably connect to the shock assembly 900. As shown in FIG. 14, the shock assembly 900 includes a main shock body 902 connected to a first connecting means 904 and a second connecting means 906 opposite the first connecting means 904. As shown in FIGS. 14-16, the first and second connecting means are single eye hooks 906, 908 configured to receive the pins 840, 890 of the clevis fasteners 830, 880. However, the connecting means 904, 906 of the shock assembly 900 may be a variety of devices that form a pivoting connection between the shock assembly 900 and the lower and upper micro-adjustable components 800, 850. The shock assembly 900 may include a fairing 910 to increase the aerodynamic properties of the shock assembly 900.

To adjust the micro-adjustable suspension system 40 at the lower micro-adjustable component 800, the coupling mechanism 830 of the connecting rod 820 must first be disengaged from the connecting means 904 of the shock assembly 900. This is done by removing the cotter pin 848 of the clevis fastener 840 in the embodiment of the invention as illustrated in FIGS. 14-16. The threaded surface 826 of the connecting rod 820 engages the threaded surface 812 of the channel 804, allowing the connecting rod 820 to be adjusted by rotating the connecting rod 820 in the desired direction to reach the desired result. The same process is performed to make adjustments at the upper micro-adjustment component 850.

Figure 17A:
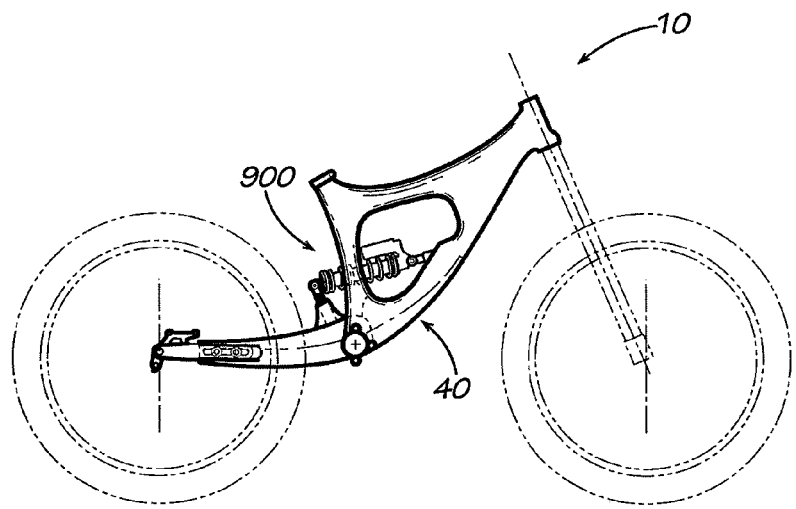
FIG. 17A is a side view of a bicycle frame according to one embodiment of the present invention.
Figure 17B:
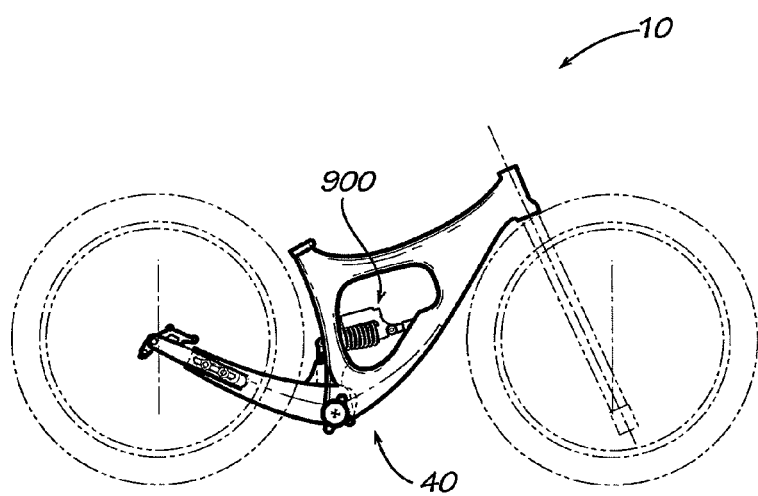
FIG. 17B is a side view of the bicycle frame of FIG. 17A.

Adjusting the connecting rod 820 of the lower micro-adjustable component 800 impacts the clearance of the bottom bracket of the frame 10. For example, if clearance is to be increased, the connecting rod 820 is rotated away from the rear suspension arm 25, which pushes the rear suspension arm 25 lower, as shown in FIG. 17A. If the clearance is to be decreased, the connecting rod 820 is rotated away from the rear suspension arm 25, resulting in a smaller clearance, as shown in FIG. 17B. The ledge 810 of the channel 804 and the ledge 828 of the connecting rod 820 limit the adjustment available, preventing the connecting rod from being rotated too far, resulting in the rear wheel 50 hitting the frame 10 under full compression. Markings may be found on the connecting rod 820 to indicate the position of the connecting rod 820 needed to reach a desired travel amount.

The amount of travel of the rear suspension arm 25 can be adjusted at the upper micro-adjustment component 850. By rotating the connecting rod 870 of the upper micro-adjustable component 850 towards the down tube 16, the shock assembly 900 becomes fully extended, increasing the travel of the rear suspension arm 25. To decrease the travel, the connecting rod 870 of the upper micro-adjustable component 850 is rotated away from the down tube 16, resulting in a compressed shock assembly 900, as shown in FIG. 17B. Markings on the connecting rod 870 of the upper micro-adjustment component 850 indicate the position where the connecting rod 870 should to be placed to define the amount of suspension and/or travel. In addition to providing a precise adjustment, the micro-adjustable suspension system 40 allows the adjustment to the suspension without the need of any additional tools.

As shown in FIGS. 14-17, the micro-adjustable suspension system 40 utilizes two micro-adjustment components 800, 850 to adjust the clearance and travel of the bicycle. However, in other embodiments of the invention, bicycle frames may only utilize one micro-adjustment component to control only the clearance or the travel of the bicycle depending on the use of the bicycle.

Further, while the micro-adjustment components 800, 850 illustrated in FIGS. 14-17 utilize threaded surfaces 826, 876 on the connecting rods 820, 870 and the threaded surfaces 812, 862 of the channels 804, 854 for a controlled adjustment of the rods within the channels, other means may be utilized. For example, a ratcheting system may be used in one embodiment of the present invention. In another embodiment of the present invention, a connecting rod may comprise several uniform, parallel apertures that extend across the connecting rod along the length of the connecting rod that correspond to a single parallel aperture that extends through the mount and the channel of the mount. One of the apertures of the connecting rod is aligned with the apertures of the mount, and a pin is inserted through both apertures to secure the rod in the desired position. Other adjustment means may be utilized by the micro-adjustment suspension system 40, and are not limited to those disclosed above.

To the extent necessary to understand or complete the disclosure of the present invention, all publications, patents, and patent applications mentioned herein are expressly incorporated by reference therein to the same extent as though each were individually so incorporated.

Having thus described exemplary embodiments of the present invention, those skilled in the art will appreciate that the within disclosures are exemplary only and that various other alternatives, adaptations, and modifications may be made within the scope of the present invention. Accordingly, the present invention is not limited to the specific embodiments as illustrated herein, but is only limited by the following claims.

What is claimed is:

1. An adjustable dropout assembly for a bicycle frame comprising:
    (A) an adjustable dropout component comprising;
        i. a first dropout arm; and
        ii. a second dropout arm, wherein both the first dropout arm and the second dropout arm further comprise a wheel end configured to receive a rear wheel and a frame end, wherein the frame end of the first dropout arm further comprises a ratcheted surface; and
    (B) a rear suspension component configured for adjustably retaining the adjustable dropout component, wherein the adjustable dropout component is further configured to be removable from the rear suspension component, wherein the rear suspension component further comprises:
        i) a first chainstay arm comprising a first recess configured to receive the frame end of the first dropout arm, the first recess comprising at least one ratcheted surface configured to engage the ratcheted surface of the first dropout arm; and
        ii) a second chainstay arm configured to receive the second dropout arm.

2. The adjustable dropout assembly of claim 1, wherein the frame end of the first dropout arm further comprises a wedge shape and the first recess of the first chainstay arm further comprises edges that correspond to the wedge shape of the first dropout arm.

3. The adjustable dropout assembly of claim 1, wherein the first chainstay arm further comprises a second recess configured to receive a sliding plate, wherein the sliding plate controls a range of travel for the first dropout arm within the first recess.

4. The adjustable dropout assembly of claim 1, wherein the first dropout arm and the second dropout arm further comprise aluminum 7075.

5. The adjustable dropout assembly of claim 1, further comprising a securing component configured to assist the rear suspension component in adjustably retaining the adjustable dropout component.

6. An adjustable dropout assembly for a bicycle frame comprising:
    (A) an adjustable dropout component comprising;
        i. a first dropout arm; and
        ii. a second dropout arm, wherein both the first dropout arm and the second dropout arm further comprise a wheel end configured to receive a rear wheel and a frame end; and
    (B) a rear suspension component configured for adjustably retaining the adjustable dropout component, wherein the adjustable dropout component is further configured to be removable from the rear suspension component, wherein the rear suspension component further comprises:
        i) a first chainstay arm comprising:
            a) a first recess configured to receive the frame end of the first dropout arm; and
            b) a second recess configured to receive a sliding plate, wherein the sliding plate controls a range of travel for the first dropout arm within the first recess; and
        ii) a second chainstay arm configured to receive the second dropout arm.

7. The adjustable dropout assembly of claim 6, wherein the frame end of the first dropout arm further comprises a wedge shape and the first recess of the first chainstay arm further comprises edges that correspond to the wedge shape of the first dropout arm.

8. The adjustable dropout assembly of claim 6, wherein the first dropout arm and the second dropout arm further comprise aluminum 7075.

* * * * *